US008539242B2

(12) United States Patent
Jung et al.

(10) Patent No.: US 8,539,242 B2
(45) Date of Patent: *Sep. 17, 2013

(54) VOICE-CAPABLE SYSTEM AND METHOD FOR PROVIDING INPUT OPTIONS FOR AUTHENTICATION

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1543 days.

This patent is subject to a terminal disclaimer.

(21) Appl. No.: 11/314,940

(22) Filed: Dec. 21, 2005

(65) Prior Publication Data

US 2007/0143625 A1    Jun. 21, 2007

(51) Int. Cl.
*G06F 21/00* (2013.01)

(52) U.S. Cl.
USPC .................. 713/182; 704/E17.016; 713/185; 713/186; 726/17; 726/19

(58) Field of Classification Search
USPC ................. 713/182, 185, 186; 704/E17.016; 726/17, 19
See application file for complete search history.

(56) References Cited

U.S. PATENT DOCUMENTS

| 4,761,807 | A * | 8/1988 | Matthews et al. .......... 379/88.26 |
| 5,774,525 | A * | 6/1998 | Kanevsky et al. .......... 379/88.02 |
| 6,275,940 | B1 * | 8/2001 | Edwards et al. .................. 726/2 |
| 7,039,951 | B1 * | 5/2006 | Chaudhari et al. ................ 726/7 |
| 7,484,102 | B2 * | 1/2009 | Ingerman et al. ............. 713/182 |
| 2003/0149881 | A1 * | 8/2003 | Patel et al. ..................... 713/186 |
| 2005/0071168 | A1 * | 3/2005 | Juang et al. .................... 704/273 |
| 2012/0109803 | A1 * | 5/2012 | Seugling et al. ................. 705/35 |

* cited by examiner

*Primary Examiner* — Amare F Tabor

(57) ABSTRACT

A system and method for use with a voice-capable system, includes but is not limited to a method including receiving one or more user-centric authentication preferences, and preparing one or more categories of authentication questions based on the one or more user-centric authentication preferences.

39 Claims, 6 Drawing Sheets

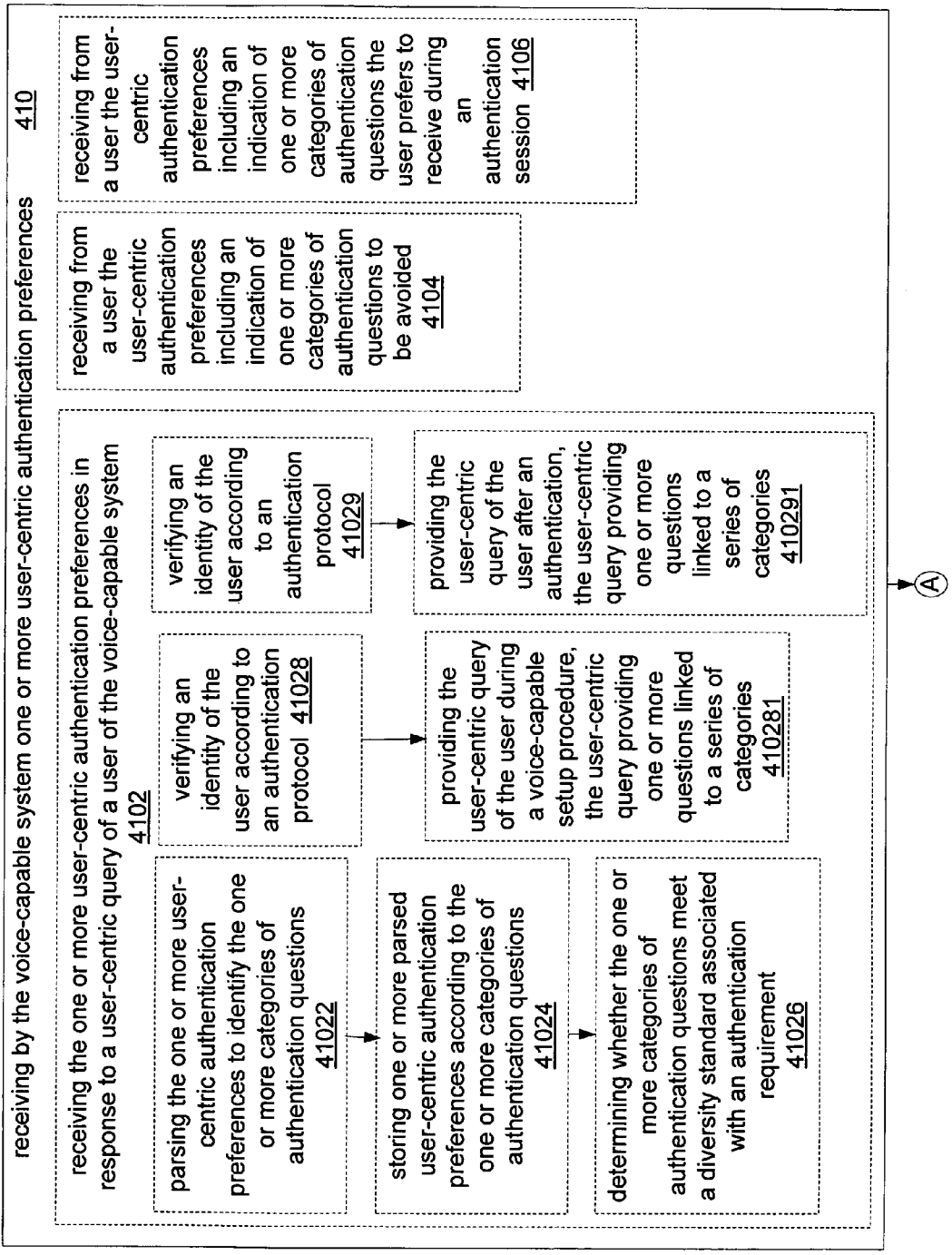

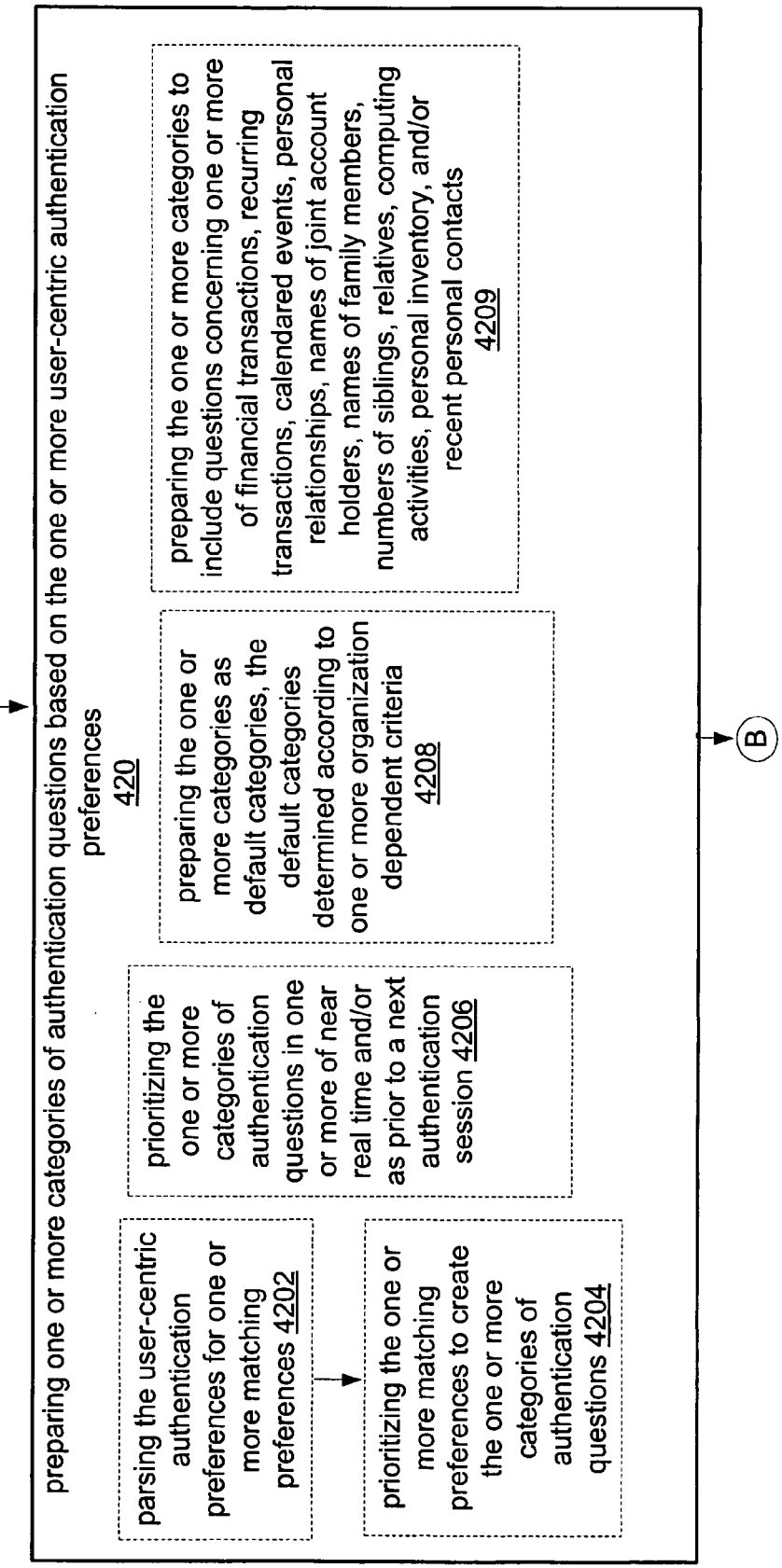

VOICE-CAPABLE SYSTEM AND METHOD FOR PROVIDING INPUT OPTIONS FOR AUTHENTICATION

TECHNICAL FIELD

The present application relates generally to security systems.

SUMMARY

In one aspect, a method for use with a voice-capable system includes but is not limited to receiving one or more user-centric authentication preferences; and preparing one or more categories of authentication questions based on the one or more user-centric authentication preferences. In addition to the foregoing, other method aspects are described in the claims, drawings, and text forming a part of the present application.

In another aspect, a computer program product includes but is not limited to a signal bearing medium bearing at least one of one or more instructions for receiving one or more user-centric authentication preferences; and one or more instructions for preparing one or more categories of authentication questions based on the one or more user-centric authentication preferences. In addition to the foregoing, other computer program product aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other system aspects are described in the claims, drawings, and text forming a part of the present application.

In one aspect, a voice-capable system includes but is not limited to a processor, an audio input and/or output circuitry coupled to the processor, a memory coupled to the processor, and a security module coupled to the processor, the security module configured to implement a secure protocol, the secure protocol configured to implement an automated system with one or more questions related to security/authentication, the security module configured to include an access module for receiving one or more user-centric authentication preferences, and a category preparation module for preparing one or more categories of authentication questions based on the one or more user-centric authentication preferences. In addition to the foregoing, other voice-capable system aspects are described in the claims, drawings, and text forming a part of the present application.

In addition to the foregoing, various other method, system, and/or computer program product aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the application can be obtained when the following detailed description of the disclosed embodiments is considered in conjunction with the following drawings, in which:

FIGS. 4A, 4B, and 4C illustrate a flow diagram of a method in accordance with an embodiment of the subject matter of the present application.

DETAILED DESCRIPTION OF THE DRAWINGS

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

According to William Crossman, Founder/Director of CompSpeak 2050 Institute for the Study of Talking Computers and Oral Cultures, VIVOs, (e.g., voice-in/voice-out computers that may operate using visual displays) may make written language obsolete. VIVOs potentially can perform the functions of written language without requiring people to learn to read and write and, therefore, enable illiterate people, using VIVOs, to access the stored information.

Opening the doors for potentially billions of people to electronically-stored data presents a host of issues related to security and/or authentication. More particularly, according to Crossman, billions of illiterate people will be able to access data previously available only to the computer literate. The increase in the number of people with access to the Internet will increase the need for security systems that address the enhanced security risk. Moreover, VIVO technology will increase the number of security systems reliant on voice commands and subject users to security risks present with voice-related systems.

To combat the security risk inherent in a VIVO system, embodiments herein present authentication and/or security solutions practical for voice-related security.

Figure 1:
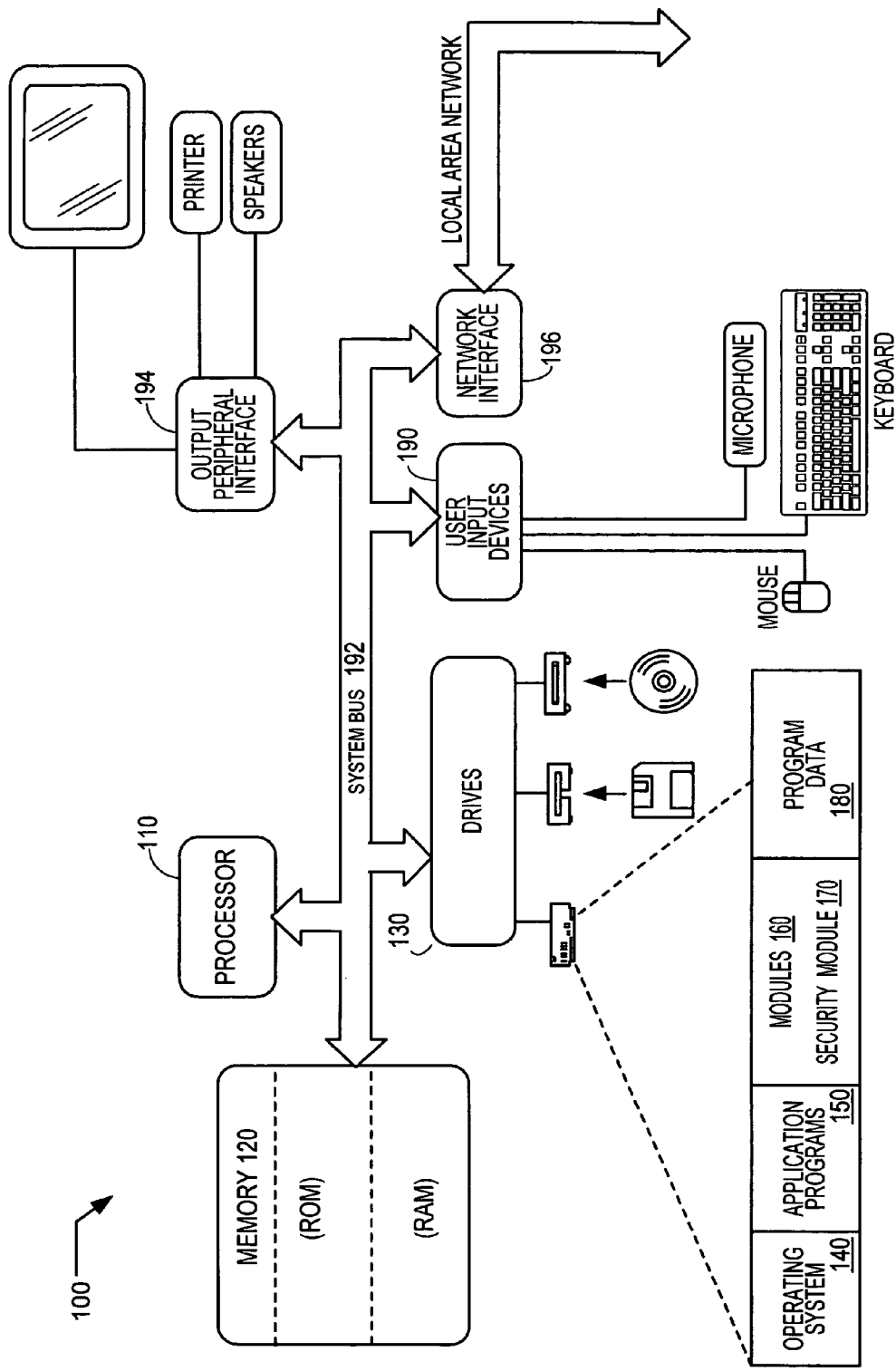
FIG. 1 is a block diagram of an exemplary computer architecture that supports the claimed subject matter of the present application.

With reference to FIG. 1, depicted is an exemplary computing system for implementing embodiments. FIG. 1 includes a computer 100, which could be a VIVO-capable computer, including a processor 110, memory 120 and one or more drives 130. The drives 130 and their associated computer storage media, provide storage of computer readable instructions, data structures, program modules and other data for the computer 100. Drives 130 can include an operating system 140, application programs 150, program modules 160, such as security module 170 and program data 180. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like. In one or more embodiments, user input devices 190 are VIVO enabling devices, enabling a user to provide voice activated responses and/or questions.

These and other input devices can be connected to processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 194 or the like. More particularly, output devices can include VIVO enabling devices capable of providing voice output in response to voice input.

Computer 100 may operate in a networked environment using logical connections to one or more computers, such as a remote computer connected to network interface 196 The remote computer may be a personal computer, a server, a router, a network PC, a peer device or other common network node, and can include many or all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note however, that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as the Internet. It will be appreciated that other means of establishing a communications link between the computers may be used.

According to one embodiment, computer 100 is connected in a networking environment such that the processor 110 and/or security module 170 determine whether incoming data follows a secure protocol. The incoming data can be from a VIVO communication device or from another data source. The secure protocol can be code stored in memory 120. For example, processor 110 can determine whether an incoming call is from a VIVO, determine that a secure protocol is necessary and apply an appropriate authentication.

Figure 2:
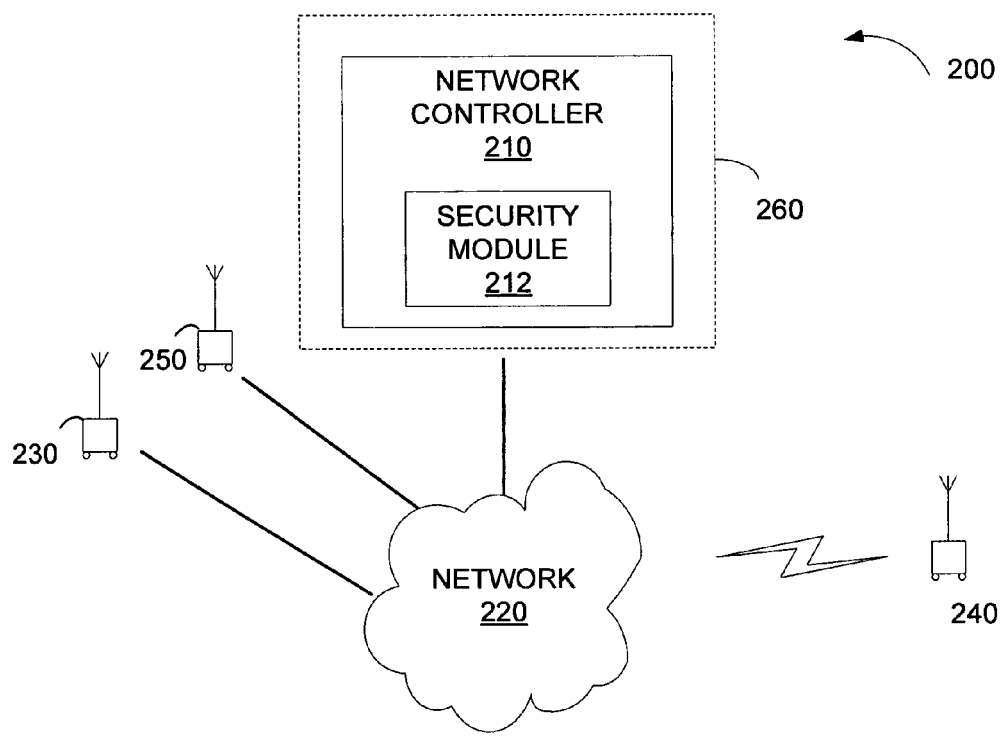
FIG. 2 is a block diagram of a network environment that supports the claimed subject matter of the present application.

Referring now to FIG. 2, illustrated is an exemplary block diagram of a system 200 capable of being operable with VIVO computer systems and interacting with a VIVO-type computer system. System 200 is shown including network controller 210, a network 220, and one or more communication devices 230, 240, and 250. Communication devices 230, 240, and 250 may include telephones, wireless telephones, cellular telephones, personal digital assistants, computer terminals or any other devices that are capable of sending and receiving data.

Network controller 210 is connected to network 220. Network controller 210 may be located at a base station, a service center, or any other location on network 220 and be included in a device 260. Network 220 may include any type of network that is capable of sending and receiving communication signals, including VIVO-type signals. For example, network 220 may include a data network, such as the Internet, an intranet, a local area network (LAN), a wide area network (WAN), a cable network, and other like communication systems. Network 220 may also include a telecommunications network, such as a local telephone network, long distance telephone network, cellular telephone network, satellite communications network, cable television network and other like communications systems that interact with computer systems. Network 220 may include more than one network and may include a plurality of different types of networks. Thus, network 220 may include a plurality of data networks, a plurality of telecommunications networks, a combination of data and telecommunications networks, and other like communication systems.

In operation, one of the communication devices 230, 240, or 250, may attempt a communication with a receiving communication device 260. The communication can be routed through network 220 and network controller 210 to the receiving communication device 260. In another example, a call originator communication device 230 may attempt a call to a call recipient communication device 240. In an embodiment, controller 210 is a VIVO-enabled controller such that an audible format may be a speech format. According to an embodiment, controller 210 can include a security module 212 that can poll the caller and a call recipient communication device 240 during call setup to pose authentication questions to secure a connection. For example, a call could be to a bank or other recipient with sensitive data requiring security.

Controller 210 can alter the format of the call by performing speech-to-text conversion on the call when controller 210 determines the format of the call requires a format change. Controller 210 can additionally alter the format of the call by performing text-to-speech conversion on the call when controller 210 determines the format of the call requires a format change. Controller 210 can then send the call in an appropriate format to the call recipient 240. In one embodiment, controller 210 is a VIVO-enabled controller that alters speech to text or speech to computer code in accordance with the requirements of a VIVO.

Figure 3:
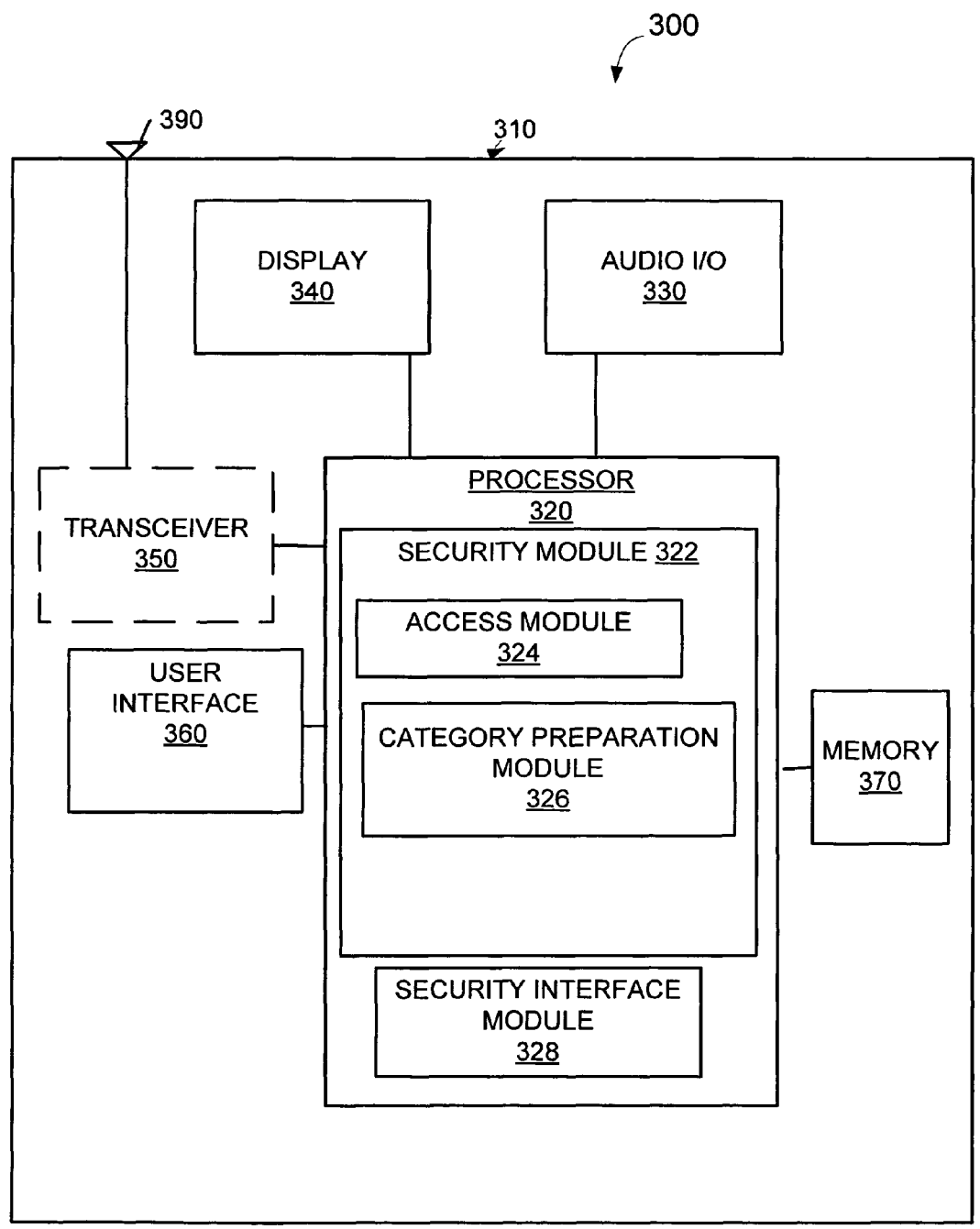
FIG. 3 is a block diagram of a communication device appropriate for embodiments of the subject matter of the present application.

FIG. 3 is an exemplary block diagram of a communication device 300, such as communication device 230 or 240 according to an embodiment (e.g. FIG. 2). Communication device 300 can include a housing 310, a processor 320, audio input and output circuitry 330 coupled to processor 320, a display 340 coupled to processor 320, a user interface 360 coupled to processor 320 and a memory 370 coupled to processor 320. According to an embodiment, processor 320 includes security module 322. Security module 322 may be hardware coupled to the processor 320. Alternatively, security module 322 could be located within processor 320, or located in software located in memory 370 and executed by processor 320, or any other type of module. Memory 370 can include a random access memory, a read only memory, an optical memory, a subscriber identity module memory, or any other memory that can be coupled to a communication device. Display 340 can be a liquid crystal display (LCD), a light emitting diode (LED) display, a plasma display, or any other means for displaying information. Audio input and output circuitry 330 can include a microphone, a speaker, a transducer, or any other audio input and output circuitry. User interface 360 can include a keypad, buttons, a touch pad, a joystick, an additional display, or any other device useful for providing an interface between a user and an electronic device.

Processor 320 can be configured to control the functions of communication device 300. Communication device 300 can send and receive signals across network 220 using a transceiver 350 coupled to antenna 390. Alternatively, communication device 300 can be a device relying on twisted pair technology and not utilize transceiver 350.

According to an embodiment, a user can use either the user interface 360 for input and output of information to and from communication device 300 or use input and output using the audio input and output circuitry 330. Data received by communication device 300 can be displayed on display 340 and/or provided audibly through audio input and output circuitry 330. Communication device 300 can operate as a VIVO when operated in a fully audible format. For example, VIVO applications can be stored on memory 370 and processed by processor 320.

According to one embodiment, the processor 320 and/or security module 322 can determine whether an incoming call follows a secure protocol. The secure protocol can be code stored in memory 370. For example, processor 320 can determine an incoming call is from a VIVO, determine that a secure protocol is necessary and apply an appropriate authentication. Conversely, processor 320 and/or security module 322 can determine that an outgoing call should follow a secure protocol and implement the secure protocol.

According to an embodiment, security module 322 is configured with modules for implementing embodiments disclosed herein. More particularly, security module 322 can be configured with access module 324 which can be configured to enable access to the voice-capable system by one or more entities computationally networked to the voice-capable system such as for receiving one or more user-centric authentication preferences. The entities computationally networked to the voice-capable system can be entities with different security requirements and required authentications. For example, an entity computationally networked to the voice-capable system can be within a same computational network, such as a local area network (LAN), or the like. Conversely, an entity computationally-networked can be networked through an internet connection but require firewall access or other security measures to connect.

Security module 322 can further include category preparation module 326 for preparing one or more categories of authentication questions based on the one or more user-centric authentication preferences.

Security module 322 is shown further including security interface module 328 configured to enable modules 324, 326 and 327 to interface with computationally networked entities.

In one embodiment, either or both computer 100 and communication device 300 operate as VIVOs that are capable of implementing a secure protocol for incoming and/or outgoing audible data and/or speech. The secure protocol, in one embodiment, implements a user-centric question and answer to authenticate one or both of incoming and outgoing data when an auditory format is detected. For example, if computer 100 or communication device 300 is used to communicate with a bank, the bank could implement a secure protocol by operating a computer 100 with a security module or a communication device 300 with a security module. Likewise, the bank could operate via a secure network such as a network described in FIG. 2, and implement a secure protocol via network controller 210 implementing a security protocol via a security module.

In one embodiment, the security module is configured with processor (e.g., in either computer 100, communication device 300, or in a network controller 210) implementing a secure protocol, the secure protocol configured to implement authentication. More particularly, the security module could include a question module configured to serve as an automated system with one or more questions related to security/authentication, the security module configured to include an access module for receiving one or more user-centric authentication preferences, and an authentication generation module for preparing one or more categories of authentication questions based on the one or more user-centric authentication preferences.

Figure 4C:
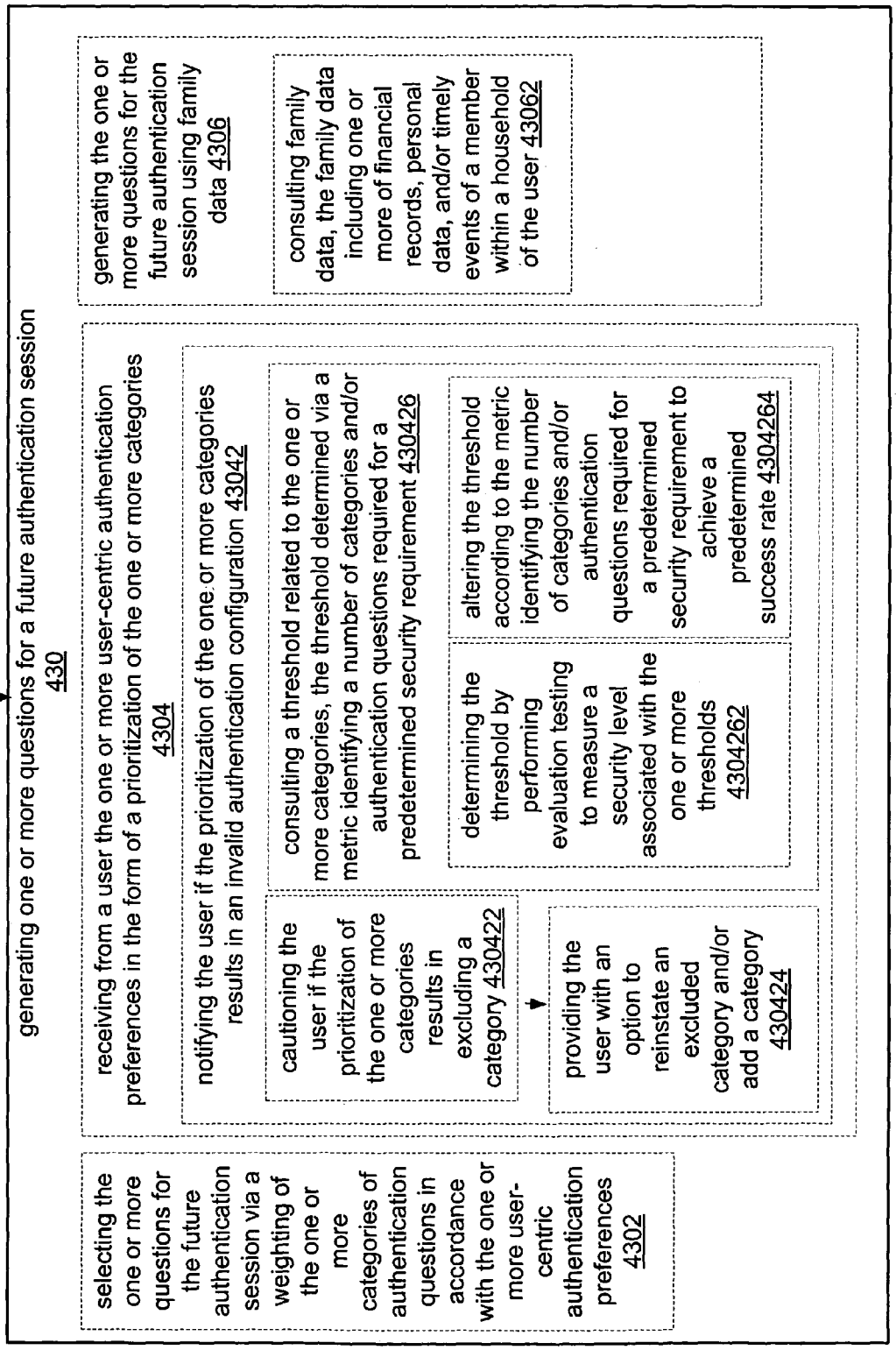

Referring now to FIGS. 4A, 4B and 4C, an exemplary flow diagram illustrates the operation of the processor 320 and/or security module 322 and/or network controller 210 according to an embodiment. One of skill in the art with the benefit of the present disclosure will appreciate that act(s) can be taken by security module 322, network controller 210, processor 110, and/or security module 170. The acts are generally referred to as being taken by a security processor.

FIGS. 4A, 4B and 4C provide methods for use with a voice-capable system, such as a system capable authentication. The authentication could be via a telephone to a security processor from a VIVO or the like. For example, a bank can receive a request to authenticate a customer, or the like. A security processor can determine that an authentication session is required. For example, the determination can be a determination by a bank that a user wishes to log into the bank. The determination can include a determination that a user is using a telephone to log into the bank via audible-only methods of communication. For example, a bank can operate via a network capable of accepting auditory communications from a user and have a computer, such as computer 100, or network controller 210, respond with auditory communications back to the user.

Block 410 provides for receiving one or more user-centric authentication preferences (e.g., security module 212 or security module 322 receiving one or more user-centric authentication preferences, via transceiver 350 or user interface 360 or the like from a network such as network 220).

Depicted within block 410 is optional block 4102, which provides for receiving the one or more user-centric authentication preferences in response to a user-centric query of a user of the voice-capable system (e.g., security module 212 or security module 322 receiving one or more user-centric authentication preferences in response to a user-centric query of a user, not shown, via transceiver 350 or user interface 360 or the like from a network such as network 220). A user-centric query can include a dialog between the voice-capable system and a user in which the user provides user-centric authentication preferences in response to the voice-capable system presenting options, asking direct questions or otherwise interacting with the user to query the user with regard to authentication preferences.

Within block 4102, a series of three blocks, 41022, 41024 and 41026 are depicted, illustrating an embodiment. Blocks 41022, 41024 and 41026 provide an optional method for receiving user-centric preferences including, in block 41022, parsing the one or more user-centric authentication preferences to identify the one or more categories of authentication questions (e.g., processor 320 parsing the user-centric authentication preferences stored in memory 370). More particularly, the parsing can include applying an algorithm that associates predetermined categories of authentication questions to the received one or more user-centric authentication preferences. An appropriate algorithm that associates predetermined categories of authentication questions can include an algorithm configured to provide a word matching via a normalized dictionary of terms; an algorithm configured to apply a logical multiplexer such that the user-centric authentication preferences are multiplexed to different predetermined categories; and/or an algorithm specifically organized for the predetermined categories such that a word search can identify one or more of the predetermined categories. An appropriate algorithm could be designed to be more or less inclusive of the number of predetermined categories to which the user-centric authentication preferences should be addressed, as will be appreciated by those of skill in the art with the benefit of this disclosure.

Block 41024 provides for storing one or more parsed user-centric authentication preferences according to the one or more categories of authentication questions (e.g., storing the one or more parsed user-centric authentication preferences in memory 370 according to the identified categories). For example, after categories of authentication questions are identified, the parsed preferences can be stored within those categories in a database, or can be stored in accordance to a data structure configured to store user-centric authentication preferences. As will be appreciated by one of skill in the art with the benefit of this disclosure, the type and complexity of a data structure for storing parsed user-centric authentication preferences will be a function of the type of security and complexity and number of users of a voice-capable system. A more secure and complex voice-capable system could require multiple levels of data structures to parse and store the user-centric authentication preferences.

Block 41026 provides for determining whether the one or more categories of authentication questions meet a diversity standard associated with an authentication requirement (e.g., processor 320 determining whether the categories of questions meet a diversity standard stored in memory 370, the diversity standard associated with an authentication requirement could also be stored in memory 370). The diversity standard, according to one embodiment, can include determining whether the number of questions meeting the user-centric preferences meets a security standard, and determining whether the number of different types of categories with user-centric preferences that meet the security standard is sufficient. For example, if a voice-capable system receives only enough user-centric preferences to load a single category of questions, a diversity standard, if present, could be flagged as not being met. A diversity standard could apply to determine a minimum, maximum and/or preferred number of categories to which user-centric preferences should apply. For example, if a user has a preference that only credit card transactions should be used for authentication, a diversity standard requiring at least two categories would conflict with the preference. Should a user attempt to limit the categories to credit card transactions, a flag could appear to either or both the user and the voice-capable system identifying the issue with authentication as being a failure to meet the diversity standard. In one embodiment, the voice-capable system could present similar but more diverse categories of questions from which the user could chose. Thus, if credit card transactions were preferred, the system could alternatively suggest that bank transactions be an additional category of questions for authentication.

Block 4102 also provides for an alternative method expanding on the receiving a user identification shown in blocks 41028 and 410281. More particularly, block 41028 provides for verifying an identity of the user according to an authentication protocol (e.g., processor 320 verifying an identity of the user provided via user interface 360 or transceiver 350 according to an authentication protocol stored in memory 370). Block 410281 provides for providing the user-centric query of the user during a voice-capable setup procedure, the user-centric query providing one or more questions linked to a series of categories (e.g., providing a user-centric query from memory 370 via user interface 360 or transceiver 350 to a user). A series of categories can include categories that are predetermined to be appropriate for authentication purposes. For example, a series of categories can include bank transactions, credit card transactions, automated teller transactions and a series of banking type categories. Alternatively, a series of categories can include an eclectic list of categories that are available to the user as chosen by the voice-capable system. These categories can be presented once during a voice-capable setup procedure such that they are stored in memory for each subsequent authentication.

Block 4102 also provides for an alternative method expanding on the receiving a user identification shown in blocks 41028 and 410281. More particularly, block 41029 provides for verifying an identity of the user according to an authentication protocol (e.g., processor 320 verifying an identity of the user provided via user interface 360 or transceiver 350 according to an authentication protocol stored in memory 370). Block 410291 provides for providing the user-centric query of the user after an authentication, the user-centric query providing one or more questions linked to a series of categories (e.g., providing a user-centric query from memory 370 via user interface 360 or transceiver 350 to a user). For example, a series of categories such as bank transactions, credit card transactions, automated teller transactions and a series of banking type categories. Alternatively, a series of categories can include an eclectic list of categories that are available to the user as chosen by the voice-capable system. These categories can be presented each time a user performs an authentication, or on a periodic basis.

Also depicted within block 410 is optional block 4104, which provides for receiving from a user the user-centric authentication preferences including an indication of one or more categories of authentication questions to be avoided (e.g., security module 212 or security module 322 receiving user-centric authentication preferences from a user via either transceiver 350 or user interface 360 memory 370 under the control of network controller 210). For example, the user-authentication preferences can include providing a user with an option to avoid an entire category of questions. As a specific example, if a user does not use debit cards very often, the user can identify that questions concerning such cards should be avoided. Also, if there are categories for which a user cannot remember information, such as transactions that occurred after a certain amount of time has passed, the user could indicate by limiting a category to a time period or the like. As another specific example, a user could want authentication to be more secure during periods of high security. Periods of high security could include a period of time after an identity theft occurrence, periods for which a user is on vacation, and periods during which the user is more vulnerable. A period of vulnerability could include a time period when the user is on active duty with the armed forces of a country or the like.

Also depicted within block 410 is optional block 4106, which provides for receiving from a user the user-centric authentication preferences including an indication of one or more categories of authentication questions the user prefers to receive during an authentication session (e.g., security module 212 or security module 322 receiving user-centric authentication preferences from a user via either transceiver 350 or user interface 360 memory 370 under the control of network controller 210). In contrast to providing an indication of questions to be avoided, a user can also indicate the type questions preferred and is likely to remember during an authentication session. As a specific example, a user could indicate that he/she prefers debit card transaction questions or questions concerning family demographic data. If a user has a large family, questions about demographic data could be more secure for that user.

Block 420, shown in FIG. 4B, provides for preparing one or more categories of authentication questions based on the one or more user-centric authentication preferences (e.g., processor 320, or security module 322 preparing categories of authentication questions after receiving user-centric authentication preferences via either user interface 360 or transceiver 350). More particularly, the voice-capable system can determine categories of questions to present to a user based on received user-centric authentication preferences. As a specific example, a user could have user-centric authentication preferences that identify debit card transactions, credit card transactions, income statements, tax data and the like. A category of questions can be determined by the voice-capable system that bundles the debit and credit card transactions and income statements as a banking data category. and bundle tax data and other similar preferences as a global financial data category.

Depicted within block 420 is optional block 4202, which provides for parsing the user-centric authentication preferences for one or more matching preferences (e.g., category preparation module parsing the user-centric authentication preferences for one or more matching preferences provided by a user, not shown, or provided via memory 370). As a specific example, the category preparation module could include a multiplexing algorithm capable of parsing authentication preferences to determine the matching preferences. The multiplexing algorithm could apply a state machine or the like in the module to determine the matching preferences and/or store the preferences in a schema stored in the memory capable of responding to the multiplexing algorithm or state machine. Shown flowing from block 4202 is optional block 4204, which provides for prioritizing the one or more matching preferences to create the one or more categories of authentication questions (e.g. processor 320 prioritizing matching preferences to create categories of authentication questions, the matching preferences and categories provided via transceiver 350, or security module 212 to a network 220, memory 370 or the like.) For example, after parsing the preferences for matching preferences that could be stored from a prior session of receiving user-centric authentication preferences or the like, any similar preferences can be matched to those earlier provided preferences or already stored preferences. Depending on the type of answers and format provided, the preferences can be prioritized according to different criteria, such as how old the preferences are and whether any of the preferences contradict an earlier preference. For example, if a user has changed circumstances, the preferences more recently received could be assumed to be more accurate. As a specific example, a user could provide new demographic data concerning address data, job location, income, and the like. The voice-capable system could process the new data and determine an inconsistency requiring a prioritization. A most-recently provided data determination would then assume that the more recently received demographic data is the more accurate data Also depicted within block 420 are optional blocks 4206, 4208 and 4209. Block 4206 provides for prioritizing the one or more categories of authentication questions in one or more of near real time and/or as prior to a next authentication session (e.g., processor 320 prioritizing the categories of authentication questions in near real time during a connection with a user, not shown). A user could be coupled to user interface 360 or via a network connection or the like, and be coupled to processor 320 or another processor such that the user-centric authentication preferences and preparation of categories to present to the user are presented in near real time or during a session.

Block 4208 provides for preparing the one or more categories as default categories, the default categories determined according to one or more organization dependent criteria (e.g., processor 320 preparing categories according to an algorithm or process provided via category preparation module 326). Category preparation module 326 could be configured to provide default categories according to known criteria that could be voice-capable system specific. For example, a voice-capable system that is for a particular industry could have industry-specific questions or the like. As a specific example, a voice-capable system directed to the oil business could present job-related questions to the user that only a user in the oil business or particularly familiar with the oil business would know. For example, a black light shone on shell deposits will illuminate a different color if oil is present. A user in the industry would know the color of the illumination. Such a question would be industry specific.

Block 4209 provides for preparing the one or more categories to include questions concerning one or more of financial transactions, recurring transactions, calendared events, personal relationships, names of joint account holders, names of family members, numbers of siblings, relatives, computing activities, personal inventory, and/or recent personal contacts (e.g., processor 320 or category preparation module 326 preparing categories according to an algorithm present in processor 320).

Block 430 provides for generating one or more questions for a future authentication session (e.g., processor 320 generating questions for a future authentication session). For example, the voice-capable system could generate questions that are similar, slightly different or the like as compared to questions presented during a current or prior authentication session.

Block 4302 provides for selecting the one or more questions for the future authentication session via a weighting of the one or more categories of authentication questions in accordance with the one or more user-centric authentication preferences (e.g. locating by processor 320 under the control of security module 322 operating with memory 370 to select the one or more questions for the future authentication session). For example, if the authentication questions prepared for a future authentication include a plurality of questions concerning demographic data, a income-related category, and banking category, the weighting of the categories could determine that the future authentication session should include more demographic data questions than banking questions based on the user-centric authentication preferences.

Block 4304 provides for receiving from a user the one or more user-centric authentication preferences in the form of a prioritization of the one or more categories (e.g., receiving via network 220 from a user, not shown, authentication preferences as a prioritization of categories provided to the user from memory 370). For example, memory 370 could hold user-centric authentication preferences stored from an initial system setup or from a later update that indicate that demographic data is preferred. Depicted within block 4304 is block 43042 which provides for notifying the user if the prioritization of the one or more categories results in an invalid authentication configuration (e.g., notifying the user via user interface 360 or over a network if the prioritization of categories is invalid as determined in category preparation module 326). As a specific example, a user could indicate that the preferred category is demographic data, but the category preparation module could have a metric requiring at least two categories are required for authentication questioning. In such a case, the inconsistency would notify the user of the inconsistency with the metric requiring at least two categories for authentication questioning.

Depicted within block 42042 is block 430422 which provides for cautioning the user if the prioritization of the one or more categories results in excluding a category (e.g., cautioning via user interface 360 if the prioritization performed by processor 320 results in excluding a category stored in memory 370). Block 430424 provides for providing the user with an option to reinstate an excluded category and/or add a category (e.g., providing a user, not shown, via user interface 360 an option via processor 320 to reinstate a category or add an alternate category for storage in memory 370). Also depicted in block 43042 is block 430426, which provides for consulting a threshold related to the one or more categories, the threshold determined via a metric identifying a number of categories and/or authentication questions required for a predetermined security requirement (e.g., processor 320 consulting a threshold stored in either memory 370 or category preparation module 326, the threshold determined via a metric stored in memory 370 or category preparation module 326, regarding a number of categories and/or questions required for a security requirement that could be stored in security interface module 328 or memory 370). In an embodiment, the threshold is determined according to security needs of either or both of a user and/or a voice-capable system. The threshold can be a function of the type of asset that needs to be protected by the authentication. Thus, the more valuable the asset to be protected by authentication, the higher the threshold for categories and/or questions. For example, a stock broker could have secure access to accounts for several clients that rely on the stock broker to manage their portfolios. The number of categories required could be more than two categories, and require at least three authentication questions or the like.

Depicted within block 430426 are two blocks, block 4304262 and block 4304264. Block 4304262 provides for determining the threshold by performing evaluation testing to measure a security level associated with the one or more thresholds (e.g., processor 320 and/or security interface module 328 performing evaluation testing to measure a security level; or security module 212 performing evaluation testing via network controller 210). The evaluation testing, in one embodiment, can include testing whether the thresholds for a voice-capable system are sufficient in comparison with like systems, appropriate for the asset involved, and the like. For example, an asset that is not an insurable interest may have a different threshold than an asset that requires a multi-million dollar insurance policy. As a result, the evaluation testing can include a determination of whether or not the threshold is appropriate as compared to the value of the asset. Thus, an authentication for access to a bill payment system for paying a $3,500.00 vehicle would have a different threshold than an authentication for access to the books and records of a large corporation. Block 4304264 provides for altering the threshold according to the metric identifying the number of categories and/or authentication questions required for the predetermined security requirement to achieve a predetermined success rate (e.g., processor 320 altering a threshold stored in memory 370 or category preparation module 326 according to the predetermined security requirement stored in memory 370). In an embodiment, the threshold for a number of categories and/or questions can be a function of a success rate for a security system. If, for example, an authentication fails to allow a bona fide user access to a voice-capable system because the threshold was set incorrectly, then the threshold can be altered. Likewise, the threshold can be increased if a user experience reflects that the threshold is too low for security purposes. Also, objective criteria can be used to determine if a predetermined security requirement is met, such as claims, complaints, reports and the like for wrongful authentications.

Block 4306 provides for generating the one or more questions for the future authentication session using family data (e.g., processor 320 altering the series of questions according to requirements provided via time authentication module 326 and questions stored in memory 370). More particularly, the generating the questions can include current family data, past family history, information on relatives and children and transactions performed by family members and the like. As a specific example, authentication questions can be generated that concern the names of family members, dates of marriages, dates of deaths, and transactions performed by family members on shared credit card accounts and the like.

Depicted within block 4306 is block 43062 which provides for consulting family data, the family data including one or more of financial records, personal data, and/or timely events of a member within a household of the user (e.g., processor 320 consulting family data stored in memory 370 and/or via a network to access the family data). For example, a user with a household with a new baby could have a diaper service, and frequent visits to a pediatrician. The authentication questions could include dates of the last visit to the pediatrician, dates of a last diaper delivery and the like.

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

We claim:

1. A method comprising:
   receiving one or more user-centric authentication preferences in response to a user-centric query of a user of a voice-capable system, the user-centric query providing one or more questions associated with one or more categories of authentication questions;
   determining whether at least some of the one or more categories of authentication questions meet a diversity standard for an authentication requirement;
   preparing the one or more categories of authentication questions based on at least one of the one or more user-centric authentication preferences;
   generating one or more questions for a future authentication session, wherein the generating one or more questions for the future authentication session includes:
      (a) receiving from the user the one or more user-centric authentication preferences in the form of a prioritization of the one or more categories of authentication questions, including:
         (1) notifying the user when the prioritization of the one or more categories of authentication questions results in an invalid authentication configuration, including:
            (A) cautioning the user when the prioritization of the one or more categories results in excluding a category; and
            (B) providing the user with an option to at least one of reinstate an excluded category or add a category; and
   wherein at least one of the receiving, the determining, the preparing, or the generating is implemented using one or more processing devices.

2. The method of claim 1, wherein the receiving one or more user-centric authentication preferences includes:
   receiving the one or more user-centric authentication preferences in response to one or more user-centric query of the user of the voice-capable system.

3. The method of claim 2, wherein the receiving the one or more user-centric authentication preferences in response to the one or more user-centric query of the user of the voice-capable system includes:
   parsing the one or more user-centric authentication preferences to identify the one or more categories of authentication questions;
   storing one or more parsed user-centric authentication preferences according to the one or more categories of authentication questions; and
   determining whether the one or more categories of authentication questions meet the diversity standard associated with the authentication requirement.

4. The method of claim 2, wherein the receiving the one or more user-centric authentication preferences in response to the one or more user-centric query of the user of the voice-capable system includes:
   verifying an identity of the user according to an authentication protocol; and providing the user-centric query of the user during a voice-capable setup procedure.

5. The method of claim 1, wherein the generating one or more questions for a future authentication session includes:
   selecting the one or more questions for the future authentication session via a weighting of the one or more categories of authentication questions in accordance with the one or more user-centric authentication preferences.

6. The method of claim 1, wherein the generating one or more questions for a future authentication session includes:
   generating the one or more questions for the future authentication session using family data.

7. The method of claim 6, wherein the generating the one or more questions for the future authentication session using family data includes:
   consulting family data, the family data including one or more of financial records, personal data, or timely events of a member within a household of the user.

8. The method of claim 1, wherein the receiving one or more user-centric authentication preferences includes:
   receiving from the user the user-centric authentication preferences including an indication of the one or more categories of authentication questions to be avoided.

9. The method of claim 1, wherein the receiving one or more user-centric authentication preferences includes:
   receiving from the user the user-centric authentication preferences including an indication of one or more categories of authentication questions the user prefers to receive during an authentication session.

10. The method of claim 1, wherein the preparing the one or more categories of authentication questions based on at least one of the one or more user-centric authentication preferences includes:
    parsing the user-centric authentication preferences for one or more matching preferences; and
    prioritizing the one or more matching preferences to create the one or more categories of authentication questions.

11. The method of claim 1, wherein the preparing the one or more categories of authentication questions based on at least one of the one or more user-centric authentication preferences includes:
    prioritizing the one or more categories of authentication questions in one or more of near real time or as prior to a next authentication session.

12. The method of claim 1, wherein the preparing the one or more categories of authentication questions based on at least one of the one or more user-centric authentication preferences includes:
    preparing the one or more categories as default categories, the default categories determined according to one or more organization dependent criteria.

13. The method of claim 1, wherein the preparing the one or more categories of authentication questions based on at least one of the one or more user-centric authentication preferences includes:

preparing the one or more categories to include questions concerning one or more of financial transactions, recurring transactions, calendared events, personal relationships, names of joint account holders, names of family members, numbers of siblings, relatives, computing activities, personal inventory, or recent personal contacts.

14. The method of claim 1, wherein the one or more categories of authentication questions are predetermined to be appropriate for one or more authentication purposes, wherein the one or more authentication purposes includes a bank transaction.

15. The method of claim 1, wherein the preparing the one or more categories of authentication questions based on at least one of the one or more user-centric authentication preferences includes:
   preparing the one or more categories as default categories, the default categories determined according to one or more organization dependent criteria, including industry specific criteria.

16. A method comprising:
   receiving one or more user-centric authentication preferences in response to a user-centric query of a user of a voice-capable system, the user-centric query providing one or more questions associated with one or more categories of authentication questions;
   determining whether at least some of the one or more categories of authentication questions meet a diversity standard for an authentication requirement;
   preparing the one or more categories of authentication questions based on at least one of the one or more user-centric authentication preferences;
   generating one or more questions for a future authentication session, wherein the generating one or more questions for the future authentication session includes:
      (a) receiving from the user the one or more user-centric authentication preferences in the form of a prioritization of the one or more categories of authentication questions, including:
         (1) notifying the user when the prioritization of the one or more categories of authentication questions results in an invalid authentication configuration, including:
            (A) consulting a threshold related to the one or more categories of authentication questions, the threshold determined via a metric identifying at least one of a number of categories or authentication questions required for a predetermined security requirement, wherein the consulting a threshold related to the one or more categories of authentication questions, the threshold determined via a metric identifying at least one of a number of categories or authentication questions required for a predetermined security requirement includes:
               (i) determining the threshold by performing evaluation testing to measure a security level associated with Rae one or more possible thresholds, and
   wherein at least one of the receiving, the determining, the preparing, or the generating is implemented using one or more processing devices.

17. A method comprising:
   receiving one or more user-centric authentication preferences in response to a user-centric query of a user of a voice-capable system, the user-centric query providing one or more questions associated with one or more categories of authentication questions;
   determining whether at least some of the one or more categories of authentication questions meet a diversity standard for an authentication requirement;
   preparing the one or more categories of authentication questions based on at least one of the one or more user-centric authentication preferences;
   generating one or more questions for a future authentication session, wherein the generating one or more questions for the future authentication session includes:
      (a) receiving from the user the one or more user-centric authentication preferences in the form of a prioritization of the one or more categories of authentication questions, including:
         (1) notifying the user when the prioritization of the one or more categories of authentication questions results in an invalid authentication configuration, including:
            (A) consulting a threshold related to the one or more categories of authentication questions, the threshold determined via a metric identifying at least one of a number of categories or authentication questions required for a predetermined security requirement, wherein the consulting a threshold related to the one or more categories of authentication questions, the threshold determined via a metric identifying at least one of a number of categories or authentication questions required for a predetermined security requirement includes:
               (i) altering the threshold according to the metric identifying the at least one of the number of categories or authentication questions required for the predetermined security requirement to achieve a predetermined success rate, and
   wherein at least one of the receiving, the determining, the preparing, or the generating is implemented using one or more processing devices.

18. A computer program product comprising:
   at least one non-transitory signal bearing medium bearing one or more instructions that, when executed by one or more processing devices, perform a process including:
   receiving one or more user-centric authentication preferences in response to a user-centric query of a user of a voice-capable system, the user-centric query providing one or more questions associated with one or more categories of authentication questions;
   determining whether at least some of the one or more categories of authentication questions meet a diversity standard for an authentication requirement;
   preparing the one or more categories of authentication questions based on at least one of the one or more user-centric authentication preferences; and
   generating one or more questions for a future authentication session, wherein the one or more instructions for generating one or more questions for a future authentication session includes:
      (a) receiving from the user the one or more user-centric authentication preferences in the form of a prioritization of the one or more categories of authentication questions, including:
         (1) notifying the user when the prioritization of the one or more categories results in an invalid authentication configuration, including:

(A) cautioning the user when the prioritization of the one or more categories of authentication questions results in excluding a category; and (B) providing the user with an option to at least one of reinstate an excluded category or add a category.

19. The computer program product of claim 18, wherein the-computer readable medium comprises:
a transmission medium.

20. The computer program product of claim 18, wherein the receiving one or more user-centric authentication preferences includes:
receiving the one or more user-centric authentication preferences in response to one or more user-centric query of the user of the voice-capable system.

21. The computer program product of claim 20, wherein receiving the one or more user-centric authentication preferences in response to one or more user-centric query of the user of the voice-capable system includes:
parsing the one or more user-centric authentication preferences to identify the one or more categories of authentication questions;
storing one or more parsed user-centric authentication preferences according to the one or more categories of authentication questions; and
determining whether the one or more categories of authentication questions meet a diversity standard associated with the authentication requirement.

22. The computer program product of claim 20, wherein receiving the one or more user-centric authentication preferences in response to the one or more user-centric query of the user of the voice-capable system includes:
verifying an identity of the user according to an authentication protocol; and
providing the user-centric query of the user during a voice-capable setup procedure.

23. The computer program product of claim 18, wherein the-computer readable medium comprises:
a recordable medium.

24. The computer program product of claim 18, wherein notifying the user if the prioritization of the one or more categories results in an invalid authentication configuration includes:
consulting a threshold related to the one or more categories, the threshold determined via at least one of a metric identifying a number of categories or authentication questions required for a predetermined security requirement.

25. The computer program product of claim 18, wherein the generating one or more questions for a future authentication session includes:
generating the one or more questions for the future authentication session using family data.

26. The computer program product of claim 25, wherein the generating the one or more questions for the future authentication session using family data includes:
consulting family data, the family data including one or more of financial records, personal data, or timely events of a member within a household of the user.

27. The computer program product of claim 18, wherein receiving one or more user-centric authentication preferences includes:
receiving from a user the user-centric authentication preferences including an indication of one or more categories of authentication questions to be avoided.

28. The computer program product of claim 18, wherein the receiving one or more user-centric authentication preferences includes:
receiving from a user the user-centric authentication preferences including an indication of one or more categories of authentication questions the user prefers to receive during an authentication session.

29. The computer program product of claim 18, wherein the preparing one or more categories of authentication questions based on the one or more user-centric authentication preferences includes:
parsing the user-centric authentication preferences for one or more matching preferences; and
prioritizing the one or more matching preferences to create the one or more categories of authentication questions.

30. The computer program product of claim 18, wherein preparing one or more categories of authentication questions based on the one or more user-centric authentication preferences includes:
prioritizing the one or more categories of authentication questions in one or more of near real time or as prior to a next authentication session.

31. The computer program product of claim 18, wherein preparing one or more categories of authentication questions based on the one or more user-centric authentication preferences includes:
preparing the one or more categories as default categories, the default categories determined according to one or more organization dependent criteria.

32. The computer program product of claim 18, wherein preparing one or more categories of authentication questions based on the one or more user-centric authentication preferences includes:
preparing the one or more categories to include questions concerning one or more of financial transactions, recurring transactions, calendared events, personal relationships, names of joint account holders, names of family members, numbers of siblings, relatives, computing activities, personal inventory, or recent personal contacts.

33. A computer-program product comprising:
at least one non-transitory signal bearing medium bearing one or more instructions that, when executed by one or more processing devices, perform a process including:
receiving one or more user-centric authentication preferences in response to a user-centric query of a user of a voice-capable system, the user-centric query providing one or more questions associated with one or more categories of authentication questions;
determining whether at least some of the one or more authentication questions meet a diversity standard for an authentication requirement;
preparing the one or more categories of authentication questions based on at least one of the one or more user-centric authentication preferences; and
generating one or more questions for a future authentication session, including:
(a) receiving from the user the one or more user-centric authentication preferences in the form of a prioritization of the one or more categories of authentication questions, including:
(1) notifying the user when the prioritization of the one or more categories results in an invalid authentication configuration, wherein the one or more instructions for notifying the user when the prioritization of the one or more categories results in an invalid authentication configuration includes:

(A) consulting a threshold related to the one or more categories of authentication questions, the threshold determined via a metric identifying at least one of a number of categories or authentication questions required for a predetermined security requirement, wherein the consulting a threshold related to the one or more categories of authentication questions, the threshold determined via a metric identifying at least one of a number of categories or authentication questions required for a predetermined security requirement includes:

determining the threshold by performing evaluation testing to measure a security level associated with the one or more thresholds.

34. A computer program product comprising:
at least one non-transitory signal bearing medium bearing one or more instructions that, when executed by one or more processing devices, perform a process including:
receiving one or more user-centric authentication preferences in response to a user-centric query of a user of a voice-capable system, the user-centric query providing one or more questions associated with one or more categories of authentication questions;
determining whether at least some of the one or more categories of authentication questions meet a diversity standard for an authentication requirement;
preparing the one or more categories of authentication questions based on at least one of the one or more user-centric authentication preferences; and
generating one or more questions for a future authentication session, wherein the one or more instructions for generating one or more questions for a future authentication session includes:
(a) receiving from the user the one or more user-centric authentication preferences in the form of a prioritization of the one or more categories of authentication questions, including:
(1) notifying the user when the prioritization of the one or more categories of authentication questions results in an invalid authentication configuration, wherein the notifying the user when the prioritization of the one or more categories results in an invalid authentication configuration includes:
(A) consulting a threshold related to the one or more categories, the threshold determined via a metric identifying at least one of a number of categories or authentication questions required for a predetermined security requirement, wherein the consulting a threshold related to the one or more categories, the threshold determined via a metric identifying at least one of a number of categories or authentication questions required for a predetermined security requirement includes:
(i) altering the threshold according to the metric identifying at least one of the number of categories or authentication questions required for the predetermined security requirement to achieve a predetermined success rate.

35. A voice-capable system comprising:
a processor;
at least one of audio input or output circuitry coupled to the processor; a memory coupled to the processor; and
a security module coupled to the processor, the security module configured to implement a secure protocol, the secure protocol configured to implement an automated system with one or more questions related to security/authentication, the security module configured to include:
an access module for receiving one or more user-centric authentication preferences;
a determination module for determining whether at least some of the one or more categories of authentication questions meet a diversity standard for an authentication requirement;
a category preparation module for preparing one or more categories of authentication questions based on the one or more user-centric authentication preferences; and
a generating module for generating one or more questions for a future authentication session, including:
(a) receiving from the user the one or more user-centric authentication preferences in the form of a prioritization of the one or more categories of authentication questions, including:
(1) notifying the user when the prioritization of the one or more categories of authentication questions results in an invalid authentication configuration, including:
(A) cautioning the user when the prioritization of the one or more categories results in excluding a category; and
(B) providing the user with an option to at least one of reinstate an excluded category or add a category.

36. The voice-capable system of claim 35, wherein the security module is at least one of coupled to the processor, located within the processor, or located in the memory.

37. The voice-capable system of claim 35, wherein the memory is one or more of a random access memory, a read only memory, an optical memory, or a subscriber identity module memory.

38. The voice-capable system of claim 35, wherein the at least one of the audio input or output circuitry includes one or more of a microphone, a speaker, a transducer, audio input or output circuitry.

39. The voice-capable system of claim 35, further comprising a housing coupled to the processor, the housing encasing at least one of the memory, the processor, the audio input or the output circuitry.

\* \* \* \* \*